(12) United States Patent
Courchesne et al.

(10) Patent No.: US 8,407,633 B2
(45) Date of Patent: Mar. 26, 2013

(54) DYNAMICALLY RECONFIGURABLE SELF-MONITORING CIRCUIT

(75) Inventors: Adam J. Courchesne, Essex Junction, VT (US); Jonathan P. Ebbers, Essex Junction, VT (US); Kenneth J. Goodnow, Essex Junction, VT (US); Suzanne Granato, Essex Junction, VT (US); Eze Kamanu, Essex Junction, VT (US); Kyle E. Schneider, Essex Junction, VT (US); Peter A. Twombly, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/605,417

(22) Filed: Oct. 26, 2009

(65) Prior Publication Data
US 2011/0099527 A1    Apr. 28, 2011

(51) Int. Cl.
    *G06F 17/50* (2006.01)
(52) U.S. Cl. .................................. 716/101; 716/104
(58) Field of Classification Search ........... 716/100–104
    See application file for complete search history.

(56) References Cited

U.S. PATENT DOCUMENTS

| | | | |
|---|---|---|---|
| 5,764,948 A | 6/1998 | Le Van Suu | |
| 6,754,881 B2 | 6/2004 | Kuhlmann et al. | |
| 6,759,870 B2 | 7/2004 | Cliff et al. | |
| 7,133,822 B1* | 11/2006 | Jacobson | 703/28 |
| 7,162,510 B2 | 1/2007 | Jammes | |
| 7,249,279 B2 | 7/2007 | Goodnow et al. | |
| 7,345,505 B2 | 3/2008 | Madurawe | |
| 7,398,501 B2 | 7/2008 | Eneboe et al. | |
| 7,810,059 B1* | 10/2010 | Trimberger | 716/136 |
| 2004/0173675 A1 | 9/2004 | Haraguchi | |
| 2005/0262383 A1 | 11/2005 | Sierer et al. | |
| 2006/0184335 A1 | 8/2006 | Odom | |
| 2007/0173959 A1 | 7/2007 | Chandhoke | |

\* cited by examiner

*Primary Examiner* — Binh Tat
(74) *Attorney, Agent, or Firm* — Gibb & Riley, LLC; Richard M. Kotulak, Esq.

(57) ABSTRACT

A method configures a plurality of circuit elements for execution of an application in a first configuration. The method monitors the execution of the application on the plurality of circuit elements to produce monitoring information, using a computerized device, and stores the monitoring information in a storage structure. The method selectively communicates the monitoring information to an external element separate from the computerized device. The external element transforms the first configuration into a second configuration based on the monitoring information. The computerized device receives the second configuration from the external element and reconfigures the plurality of elements into the second configuration.

25 Claims, 8 Drawing Sheets

DYNAMICALLY RECONFIGURABLE SELF-MONITORING CIRCUIT

BACKGROUND

1. Field of the Invention

The embodiments of the invention generally relate to dynamically reconfigurable circuits and, more specifically, to the manufacture, design and use of a dynamically reconfigurable self-monitoring circuit device that monitors current environmental and functional characteristics and dynamically reconfigure component circuits to autonomically improve their operation.

2. Description of the Related Art

Conventional application specific circuit (ASIC) designs have become increasing complex. There is an increasing demand for custom elements to optimize for specific design criteria. However, these application specific design points conflict with the need to use standard libraries, tools, and design configurations to create designs with limited turn around time (TAT). ASIC technology facilitates the creation of specialized ASIC designs. However, a method to create designs that capture the advantages of ASIC processes but also facilitate their delivery in a faster more generic manner and which offer on the fly customization would be beneficial.

SUMMARY

Disclosed herein are one or more computer-implemented methods for dynamically reconfiguring and optimizing an integrated circuit for an application. The integrated circuit comprises a plurality of circuit elements.

One method configures the plurality of circuit elements for execution of the application in a first configuration. The method monitors the execution of the application on the plurality of circuit elements to produce monitoring information, using a computerized device, and stores the monitoring information in a storage structure. The method selectively communicates the monitoring information to an external element separate from the computerized device. The external element transforms the first configuration into a second configuration based on the monitoring information. The computerized device receives the second configuration from the external element and reconfigures the plurality of elements into the second configuration.

Another method similarly configures the plurality of circuit elements for execution of the application in a first configuration. The method monitors the execution of the application on the plurality of circuit elements to produce monitoring information, using a computerized device, and stores the monitoring information in a storage structure. The method selectively communicates the monitoring information to an external element separate from the computerized device. The external element transforms the first configuration into a second configuration based on the monitoring information. The external element also tests the second configuration to eliminate faults. The computerized device receives the second configuration from the external element and reconfigures the plurality of elements into the second configuration.

An additional method configures the plurality of circuit elements for execution of the application in a first configuration. The method monitors the execution of the application on the plurality of circuit elements during use of the device by a consumer to produce monitoring information, using a computerized device, and stores the monitoring information in a storage structure. The method selectively communicates the monitoring information to an external element separate from the computerized device. The external element transforms the first configuration into a second configuration based on the monitoring information. The computerized device receives the second configuration from the external element and reconfigures the plurality of elements into the second configuration.

In the above, the monitoring information can be encrypted and/or digitally signed. Further, the second configuration can also adjust the monitoring of the execution of the application. The methods can also poll the external element for new configurations and can selectively accept portions of the second configuration by the computerized device. The external element can be located on the same chip as the integrated circuit or a chip external to the integrated circuit. The transformation can be based on a policy that is determined by a manufacturer of the integrated circuit or a manufacturer of a product that embeds the integrated circuit into a device.

BRIEF DESCRIPTION OF THE SEVERAL VIEWS OF THE DRAWINGS

The embodiments of the invention will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, there exits a need for a dynamic reconfigurable self-monitoring circuit.

Figure 1:
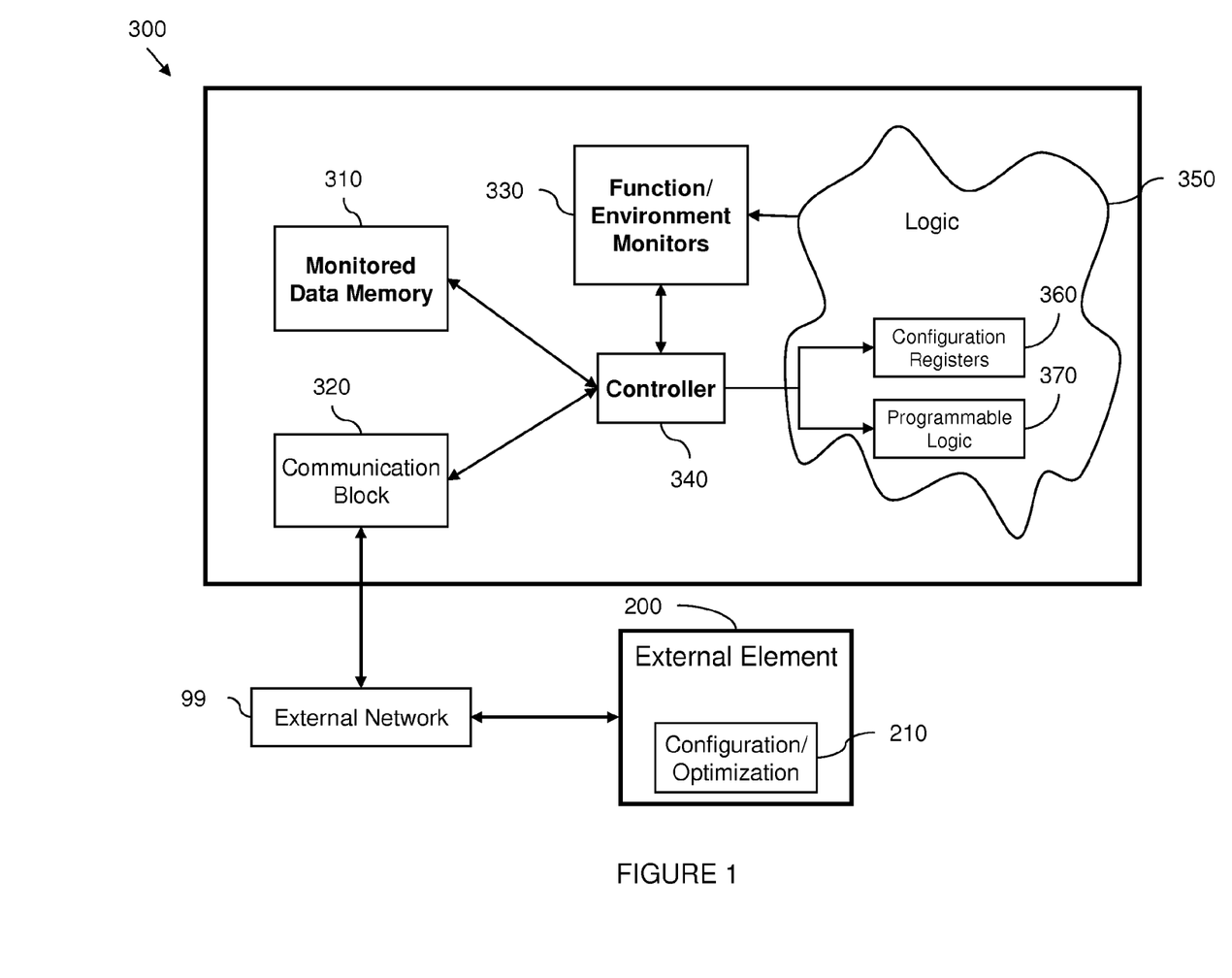
FIG. 1 is a first overview of a first exemplary dynamically reconfigurable self-monitoring circuit according to an aspect of this invention.

FIG. 1 shows a first overview of a first exemplary dynamically reconfigurable self-monitoring circuit 300 connected via an external network 99 to an external element 200. This invention provides a structure and method to reduce turn around time (TAT) involved in the creation of a dynamically reconfigurable self-monitoring circuit 300 that also increases functional efficiency. The dynamically reconfigurable self-monitoring circuit 300 receives configuration and optimization updates environmentally tailored to the operations currently executing in the end user product. The dynamically reconfigurable self-monitoring circuit 300 initiates requests for such configuration/optimization updates or receives configuration and/or optimization updates pushed to the dynamically reconfigurable self-monitoring circuit 300. The configuration/optimization updates are designed to improve runtime performance. By deferring optimization until the use phase, the use of a dynamically reconfigurable self-monitoring circuit 300 reduces effort conventionally exerted in trying to pre-optimize circuits for unknown runtime scenarios. Moreover, the interpretation and simulation on an external element 200 allows reduced size devices and/or the use of more powerful interpreters and simulators.

Functional/environmental monitoring circuits 330 within the dynamically reconfigurable self-monitoring circuit 300 store environmental and functional information and forward the stored monitoring information via a communication medium to an external element 200. In various embodiments according to this invention, the external element 200 is the provider or manufacturer of the dynamically reconfigurable self-monitoring circuit, the vendor of the device in which the dynamically reconfigurable self-monitoring circuit 300 is found, an authorized content delivery network (CDN) or the like.

The monitoring information is then interpreted by the external element 200 to determine a new configuration of the circuit elements within the dynamically reconfigurable self-monitoring circuit 300. It will be apparent that optimizations and reconfiguration are possible at various levels or hierarchies. That is, the external element 200 may optimize and reconfigure the dynamically reconfigurable self-monitoring circuit 300 for a specific user, a class of user, the embedded device manufacturer, the manufacturer of the dynamically reconfigurable self-monitoring circuit 300 and the like.

The external element 200 interprets the received monitoring information which may include information about which specific instructions were executed, sample ambient temperature, voltage or a range of environmental and/or functional features affecting the performance of the dynamically reconfigurable self-monitoring circuit 300. In various exemplary embodiments, the external element 200 interprets the received monitoring information and based on the features identified from the monitoring information determines one or more candidate configurations. In various embodiments according to this invention, the second or new configuration is selected from the candidate configurations based on simulated performance over relevant functional and environmental features identified in the monitoring information.

For example, in one exemplary embodiment, the propensity of a customer to use certain features available in a dynamically reconfigurable self-monitoring circuit 300 embedded within a smartphone device (not shown) is identified. The external element 200 then offers a second or new configuration to the user and/or customer. The external element 200 may discern that the device regularly suffers a power loss when the battery runs out while the application monitoring information indicates that videos are infrequently or never displayed. The received monitoring information is then used to inform a re-configuration/optimization process to preferentially select configurations/optimizations that extend battery life at the expense of video encoding and decoding facilities. In one exemplary embodiment, a logical update reassigns circuit elements currently associated with video encoding and decoding to functions more frequently executed by the user. The configurations and/or optimizations are then forwarded to the dynamically reconfigurable self-monitoring circuit 300 which updates itself with the new configuration and/or optimizations. The dynamically reconfigurable self-monitoring circuit 300 learns and adapts to the runtime environment and thereby avoids re-designs otherwise necessary to incorporate field learning into the product.

As noted above, conventional ASIC chips are programmed, configured, and fully synthesized into fixed hardware prior to implementation. However, this may not be found to be the most optimal solution once the critical elements are operating in the end user product.

For example, a processor with a programmable logic section may be used in multiple types of applications. Dynamically changing configuration registers and adjusting programmable sections for specific applications yields more efficient performance for some systems. Thus, in one exemplary embodiment, the dynamically reconfigurable self-monitoring circuit 300 is incorporated into gaming console hardware (not shown). The dynamically reconfigurable self-monitoring circuit 300 embedded within the gaming console hardware self-monitors usage which is forwarded to an external element 200. The dynamically reconfigurable self-monitoring circuit reconfigures and/or optimizes itself to produce graphics of certain colors and movements or to put more of its processing capacity toward another use based on the type of games users play most frequently. Logic for functions that are infrequently or never used can be re-configured for functions that are. Optimal configuration can not always be determined ahead of time and could in fact change over the life of the host product or vary across all users for the same product. Incorporating function and environmental monitors 330 in the dynamically reconfigurable self-monitoring circuit 300 to record frequent functions that occur, common instructions/operations executed, bus activities, time schedule of when activities occur, environment conditions (temp, vdd), which units of the dynamically reconfigurable self-monitoring circuit 300 are active/sleeping the most often, allows the dynamically reconfigurable self-monitoring circuit 300 to be truly application specific.

The monitored data memory 310 stores this application monitoring information until some threshold submission criteria is met. The controller 340 then sends the application monitoring information through the communication block 320 to an external entity. This criteria can be as simple as a time unit, change in environmental conditions, falling below some efficiency or performance level, or another metric that would cause the dynamically reconfigurable self-monitoring circuit 300 to initiate a request for updates. The communication block 320 has access to an external network 99 via wired bus in a SOC, internet, wi-fi, radio, cellular, or any other various communication mediums on or off chip. In the case of FIG. 1 a dynamically reconfigurable self-monitoring circuit 300 may be sending this application monitoring information directly off chip to an external element 200 or the external element 200 can be the controller in the next level of hierarchy in an ASIC chip the dynamically reconfigurable self-monitoring circuit 300 resides in.

When the external element 200, be it the manufacturer or other, receives the application monitoring information and optional circuit identifier from the dynamically reconfigurable self-monitoring circuit 300 on when, where, and specifically how the device is being used, this is interpreted by the external element 200 to determine a more efficient configuration, programming, or logic structure for the dynamically reconfigurable self-monitoring circuit 300. By keeping this function, be it hardware, software, or a combination of the two, out of the dynamically reconfigurable self-monitoring circuit 300, the complexity and size of the circuit is not increased. This keeps the overhead of such a routine in a central external element 200 that can service multiple dynamically reconfigurable self-monitoring circuits 300.

Once the external element 200 determines configuration updates that will allow the dynamically reconfigurable self-monitoring circuit to function most efficiently in its current environment this data is sent back to the dynamically reconfigurable self-monitoring circuit 300 through the external network 99 where it is received by the communication block 320 and forwarded to the controller 340. The controller 340 can compare the suggested optimization updates from the external element 200 to the current configuration to determine if anything needs to be updated or if this already is the current configuration. In some of the various exemplary embodiments, the external element 200 is within a system on a chip (SOC). Application monitoring continues until some threshold submission criteria where the controller 340 again sends information out to the external network 99 via the communication block 320 and the cycle continues. This ensures that if usage changes over time optimizations can be made to increase efficiency in the new operating environment.

To avoid false or corrupted updates from external entities not entitled to service the respective dynamically reconfigurable self-monitoring circuit 300, encryption and ID codes can be used to tag runtime information transferred between the dynamically reconfigurable self-monitoring circuit 300 and an external element 200 to ensure only valid owners are sending updates and only designated dynamically reconfigurable self-monitoring circuits 300 can receive these optimizations.

Figure 2:
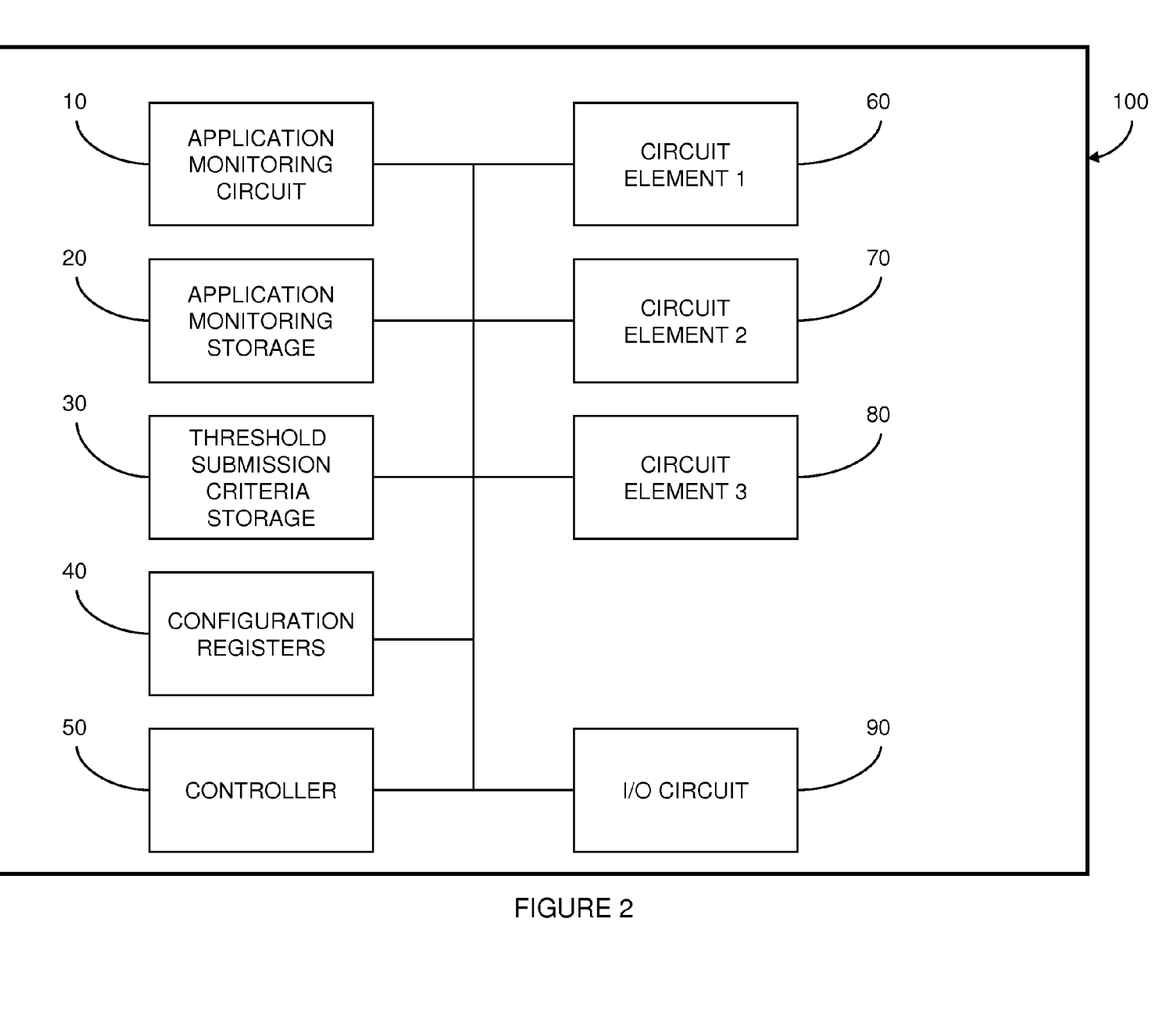
FIG. 2 is a second overview of a first exemplary dynamically reconfigurable self-monitoring circuit according to an aspect of this invention.

FIG. 2 is an overview of a first exemplary integrated circuit according to an aspect of this invention. The dynamically reconfigurable self-monitoring circuit 100 comprises an application monitoring circuit 10; and application monitor storage 20; a threshold submission criteria storage 30; configuration registers 40; a computerized device or controller 50; a circuit element 1 60; a circuit element 2 70; a circuit element 3 80; each connected to a communication link 99 via an input/output circuit 90.

The controller 50 retrieves the threshold submission criteria from a threshold submission criteria storage 30. The threshold submission criteria specifies when the controller forwards stored application monitoring information to an external device (not shown) over the communication link 99.

The controller 50 retrieves a first configuration from the configuration registers 40. The configuration registers configure the circuit elements 1-3 60-80 of the dynamically reconfigurable self-monitoring circuit 100 for applications to be executed.

The controller 50 then executes one or more applications. During the execution of the one or more applications, the application monitoring circuit 10 determines how the applications execute over a period of time. For example, where an application is an operating system such as Linux, Symbian®, MS Windows®, Android or the like, the application may be comprised of multiple discrete applications. Logical and/or environmental characteristics associated with the execution of each application are recorded in the application monitoring storage 20. Environmental characteristics may include the ambient temperature surrounding the device, the temperature of the chip, circuit voltage, device voltage, power consumption, operating frequency and/or other available information affecting the environment. Logical characteristics may include the mapping of operations or instructions to specific circuit elements, the order or frequency of application usage or the like. For example, in one exemplary embodiment, the logical functions that circuit element 1 60 performs under a given configuration are monitored and stored in the application monitoring storage 20.

The controller 50 retrieves the application monitoring information from the application monitoring storage 20 when the threshold submission criteria is reached and/or exceeded. The threshold submission criteria may be specified in a number of ways, such as a specific period of time, a volume of monitoring information, a specific monitored value falling within a specified range and/or various combinations. Once the threshold submission criteria are reached, the controller 50 forwards the monitoring information to the external element (not shown) over the communication link 99 via the I/O circuit 90.

In various exemplary embodiments, the communications link 99 may be an internet connection, a wireless link or any other type of communication link capable of communicating the monitoring information to the external element (not shown).

A subsequent configuration loaded into the configuration registers 40 of the embedded dynamically reconfigurable self-monitoring circuit 100 re-allocates one or more of the circuit elements 1-3 60-80 from a first logical operation to a second logical operation based on the interpreted monitoring information from the application monitoring storage 20.

The application monitoring of the new configuration then continues. The external element then determines new configurations which are used to reconfigure the dynamically reconfigurable self-monitoring circuit.

Figure 3:
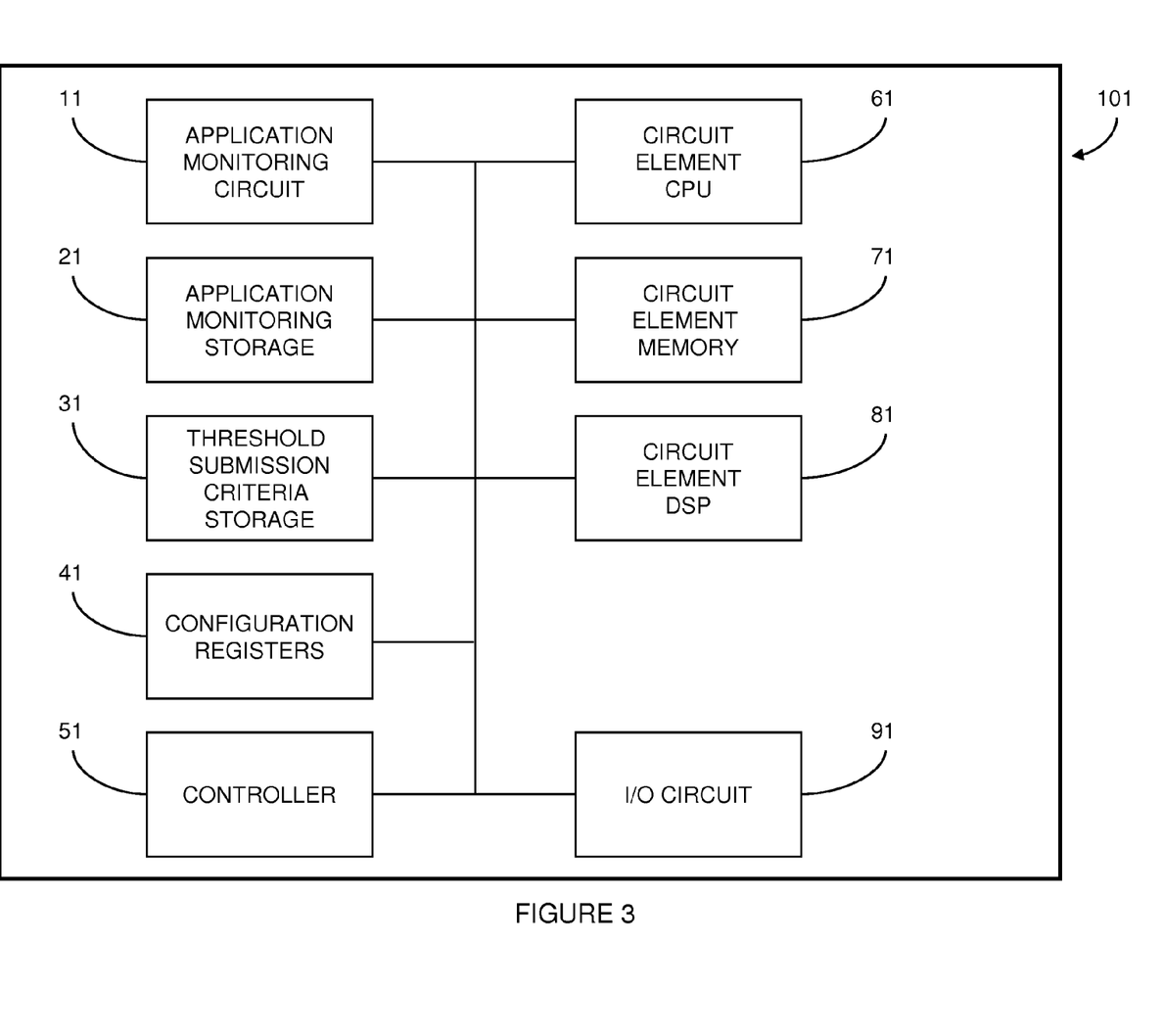
FIG. 3 is an overview of a second exemplary dynamically reconfigurable self-monitoring circuit according to an aspect of this invention.

FIG. 3 is an overview of a second exemplary dynamically reconfigurable self-monitoring circuit 101 according to an aspect of this invention. The second exemplary dynamically reconfigurable self-monitoring circuit 101 is comprised of: an application monitoring circuit 11; an application monitoring storage 21; a threshold submission criteria storage 31; a configuration register 41; a controller 51, a CPU circuit element 61; a memory circuit element 71; a DSP circuit element 81; each connected via I/O circuit 91 to communications links 99 and external element (not shown).

The controller 51 retrieves the threshold submission criteria from the threshold submission criteria storage 31. The threshold submission criteria determine when stored monitoring information or data is communicated to the external element (not shown) over the communications links 99.

The controller 51 retrieves the current configuration from the configuration registers. The current or first configuration may be previously stored in the configuration registers. In various embodiments according to this invention, the configuration registers reflect the current configuration of the second exemplary dynamically reconfigurable self-monitoring device 101.

The controller 51 configures the CPU circuit element 61, the memory circuit element 71 and the DSP circuit element 81 based on the configuration registers. In one embodiment, a portion of the memory circuit element 71 contains optimized values associated with a codec used by the device in which the second exemplary reconfigurable self-monitoring device 101 is embedded. The optimized values stored in the portion of the memory circuit element 71 are dynamically updated as needed. That is, as the use of the device changes, different optimized values associated with the codec are selected which improve performance. The configuration registers within the dynamically reconfigurable self-monitoring circuit allow these new optimized values to be dynamically associated with the second exemplary dynamically reconfigurable self-monitoring circuit 101 without requiring additional integration work at the device level.

The controller 51 facilitates integration and customization of the second exemplary dynamically reconfigurable self-monitoring circuit 101 based on specific application requirements while facilitating the use of standard components that help reduce costs.

The controller 51 loads and executes one or more applications. The applications may comprise an operating system or discrete applications. The application monitoring circuit 11 monitors the environmental and functional characteristics of the applications. The application monitoring circuit 11 may utilize voltage, temperature or other sensors to determine environmental characteristics. However, it will be apparent that in various embodiments according to this invention, Global Positioning System (GPS) or other location information is monitored and combined with externally accumulated location-tagged information. For example, ambient air temperature or other temporally ordered and location tagged environmental characteristics may be determined from external sensors and combined with GPS and temporal information associated with the device. Thus, devices in which the dynamically reconfigurable self-monitoring circuit is embedded can be more easily optimized for operation in extreme environments.

Figure 4:
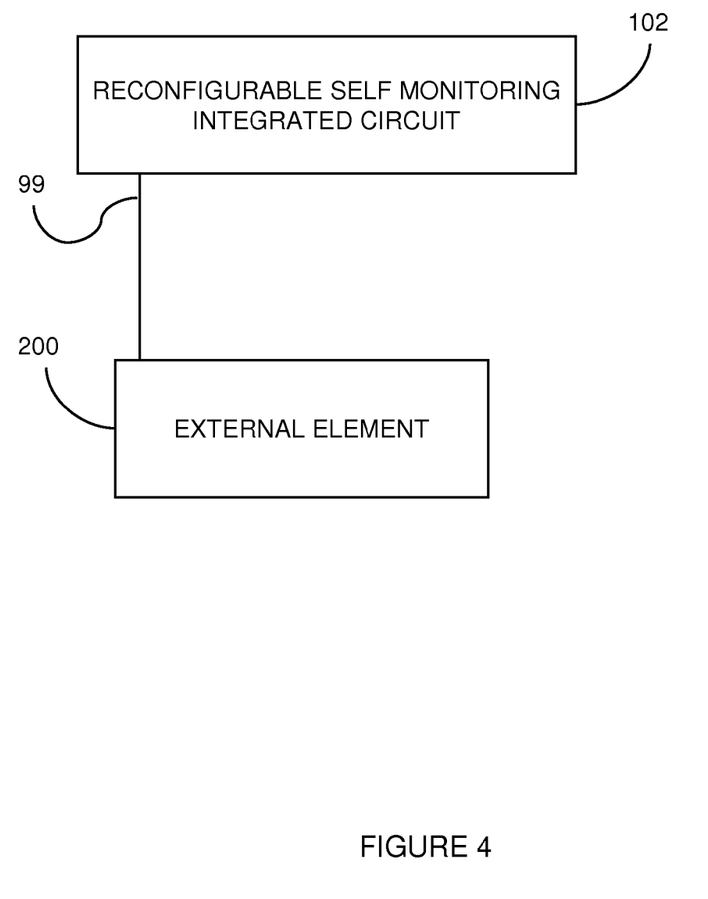
FIG. 4 is an overview of a third exemplary dynamically reconfigurable self-monitoring circuit and an external element according to an aspect of this invention.

FIG. 4 is an overview of a third exemplary dynamically reconfigurable self-monitoring circuit 102 and an external element 200 according to an aspect of this invention. The third exemplary dynamically reconfigurable self-monitoring circuit 102 loads and executes applications under a first configuration. Environmental and functional characteristics of the executing applications are monitored and stored as application monitoring data or information. The stored application monitoring information or data is forwarded from the third exemplary dynamically reconfigurable self-monitoring circuit 102 to the external element 200 when specified threshold submission criteria are reached. The threshold submission criteria may specify one or more specific attributes, value and/or patterns of attributes and values to be met before the threshold submission criteria are satisfied.

The external element 200 receives the application monitoring data from the third exemplary dynamically reconfigurable self-monitoring circuit 102 over the communications link 99. The external element 200 interprets the stored application monitoring information or data. In various exemplary embodiments according to this invention, the stored application monitoring information is used to simulate the operation of various candidate configurations. A preferred configuration is then selected from the candidate configurations that meet specified criteria. It will be apparent that the specified selection criteria may be further customized to the client and/or the user. Thus, a client (such as the manufacturer of the device in which reconfigurable self-monitoring circuit 102 is embedded) may request and/or authorize only configuration updates that reduce power consumption or which extend product life (or cost). In contrast, an authorized end-user may request configuration updates that trade-off power consumption for increased performance or the like.

To facilitate the update process, the configuration updates may be encrypted and/or digitally signed. Moreover the dynamically reconfigurable self-monitoring device 102 may be configured to accept some, all or none of the offered updates based on one or more policies. Thus, in one exemplary embodiment, the third exemplary dynamically reconfigurable self-monitoring circuit 102 is pre-configured to communicate with the manufacturer of the host device, the manufacturer of the third exemplary dynamically reconfigurable self-monitoring circuit 102, a service provider, a content provider, and/or a third party update provider.

Figure 5:
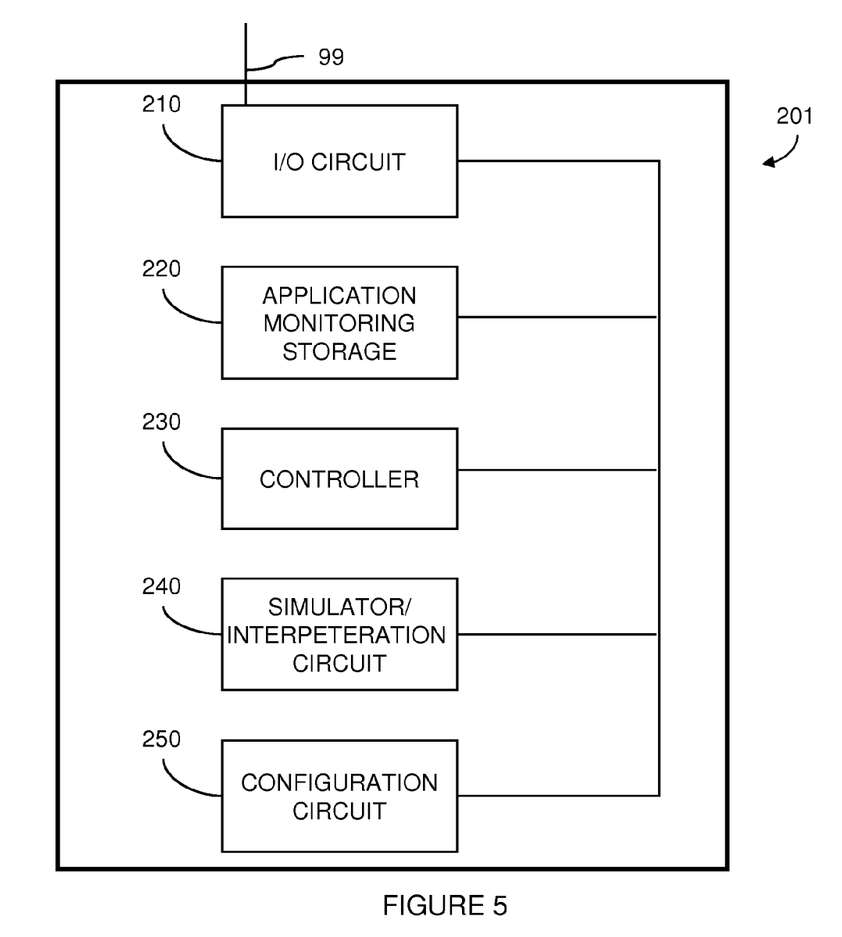
FIG. 5 is an exemplary external element according to an aspect of this invention.

FIG. 5 is an exemplary external element 201 according to an aspect of this invention. The exemplary external element 201 comprises: an application monitoring storage 220; a controller 230; a simulator/interpreter circuit 240; a configuration element circuit 250; each connected via I/O circuit 210 to the communications link 99.

The controller 230 activates the I/O circuit 210 to receive the application monitoring information from a reconfigurable self-monitoring circuit via the communications link 99. The controller stores the application monitoring information in the application monitoring storage 220. The controller 230 then activates the simulator/interpreter circuit 240 to determine candidate configurations for the reconfigurable self-monitoring device based on the application monitoring information stored in the application monitoring storage 220. In various exemplary embodiments according to this invention, environmental and functional characteristics are identified and used to facilitate the identification of reconfigurations and/or optimizations for the reconfigurable self-monitoring circuit.

After the simulations have been are performed based on the constraints, a second or subsequent configuration is selected by the configuration element circuit 250 based on the simulation results.

The second or subsequent configuration is optionally signed and/or encrypted and forwarded by the I/O circuit 210 to the dynamically reconfigurable self-monitoring device (not shown) over the communications link 99. It should be apparent that the various circuits described above may be implemented as circuits or as subroutines within a processor without departing from the spirit or scope of this invention.

Figure 6:
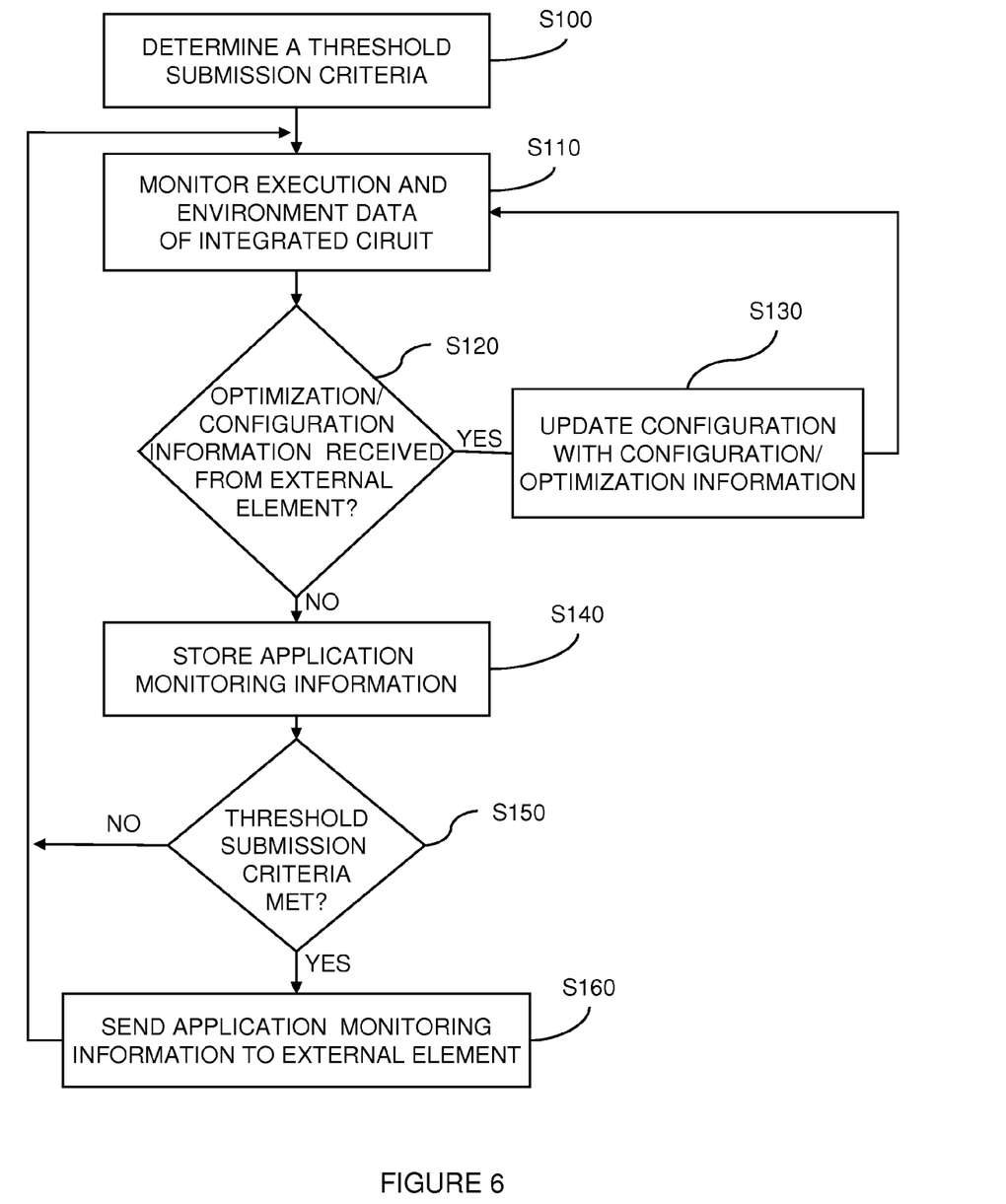
FIG. 6 is an exemplary flowchart of a method for dynamically reconfiguring/optimizing and self-monitoring an integrated circuit according to an aspect of this invention.

FIG. 6 is an exemplary flowchart of a method for dynamically reconfiguring/optimizing and self-monitoring of an integrated circuit according to an aspect of this invention. The process begins at step S100 where the threshold submission criteria are determined. The process then continues to step S110 where the execution of an application is monitored. The monitoring comprises environmental and functional characteristics of an application executing within the device. After application monitoring is initiated, control continues to step S120.

In step S120, a determination is made as to whether any optimizations and/or configurations have been received from an external element. The optimizations and configuration changes reflect changes to how an application executes within the dynamic reconfigurable self-monitoring device, changes in how functional elements are allocated to accomplish tasks or the like. If it is determined in step S120 that a configuration and/or optimization has not been received, control continues to step S140, otherwise control jumps to step S130.

The configuration and/or optimization data is used to update the configuration of the programmable circuit elements in step S130. Control then jumps to step S110. Steps S110-S130 are repeated until it is determined in step S120 that no further updates have been received. Control then umps to step S140.

The application monitoring information is stored in step S140. Control then continues to step S150 where it is determined if the threshold submission criteria have been met. The threshold submission criteria may be one or more attribute value pairs, ranges of values, a sequence of attribute value pairs and/or ranges and the like. If the threshold submission criteria are not met, control jumps to step S110, otherwise control continues to step S160.

In step S160, the application monitoring information is forwarded to the external element and control jumps to step S110.

Figure 7:
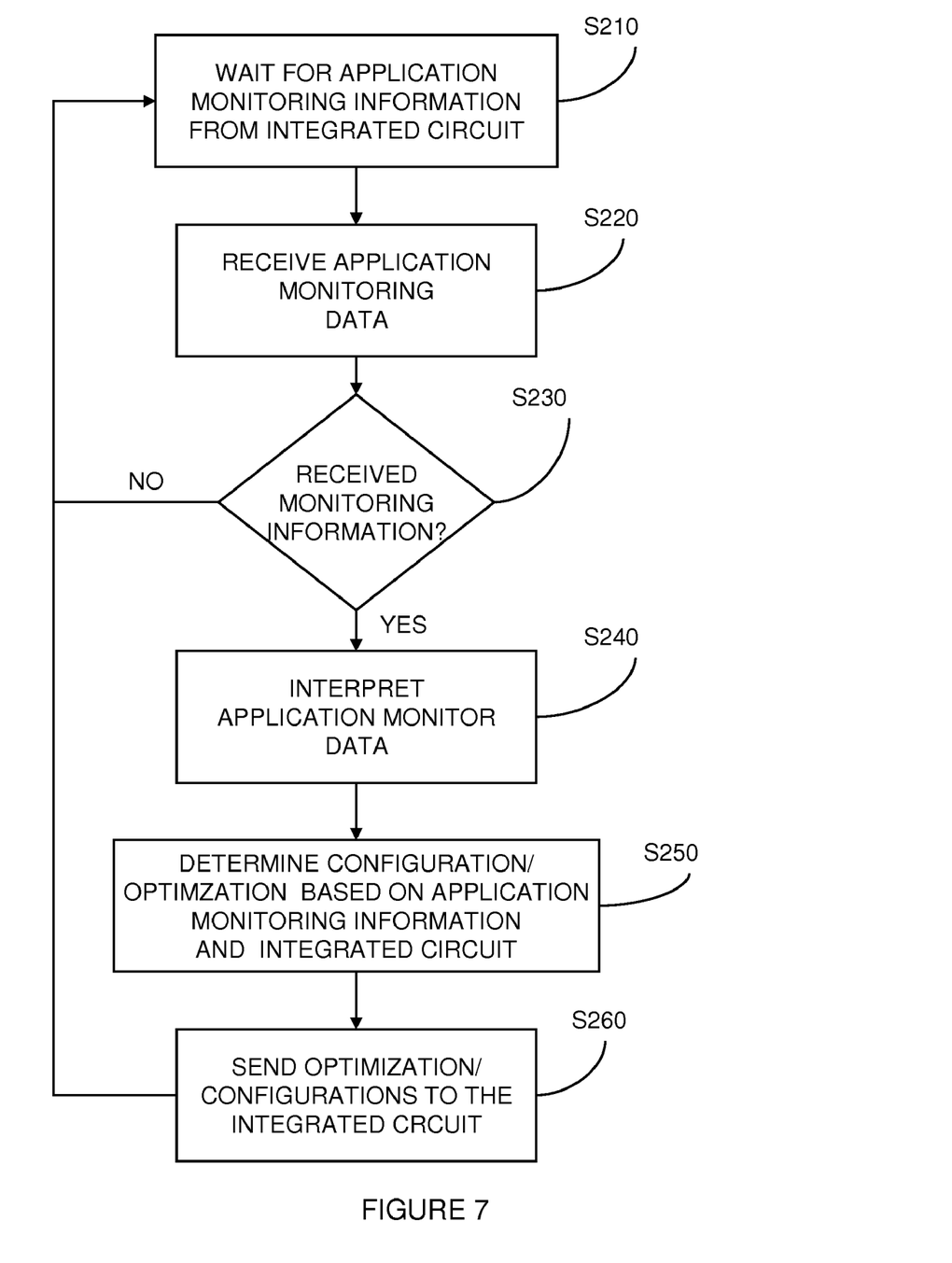
FIG. 7 is an exemplary flowchart of a method for dynamically reconfiguring and optimizing an integrated circuit according to an aspect of this invention.

FIG. 7 is an exemplary flowchart of a method for dynamically reconfiguring and optimizing of an integrated circuit according to an aspect of this invention. Control begins at step S210 awaiting the application monitoring information from a dynamically reconfigurable self-monitoring circuit according to this invention. Control proceeds to step S220 when the application monitoring information received. The application monitoring information reflects environmental and functional characteristics associated with the execution of a dynamic reconfigurable self-monitoring circuit.

For example, the application monitoring information may include, but is not limited to temperature, voltage, operating frequency or other environmental features identified during the execution of one or more applications on the dynamically reconfigurable self-monitoring circuit. The application monitoring information may also include the instructions executed by the applications, the details of applications such as the type and frequency of invoked graphic elements in the display of the host device and the like. Some types of functional information are used to identify which hardware or circuit elements are being used most frequently. Less frequently used circuit elements may be identified as candidates for functional reconfiguration during the later interpretation and/or simulation steps.

Control then continues to step 230 where a determination is made as to whether the application monitoring information has been received. If the application monitoring information has not been received, control jumps to step S210. Steps S210-S220 are then repeated until the application monitoring information is received. Control then continues to step S240.

In step S240, the application monitoring information is interpreted and simulated. In various exemplary embodiments according to this invention, the interpretation integrates different types of application monitoring information. For example, power consumption of a dynamically reconfigurable self-monitoring circuit may be combined with temperature information indicating the batter power source operates poorly at higher ambient temperatures. Thus, when the circuit embedded within a device is exposed to these extreme ambient temperatures, a configuration update may be delivered to the dynamically reconfigurable self-monitoring circuit that improves the execution of the applications in this type of environment. After the application monitoring information has been interpreted. Control then continues to step S250.

In step S250 a new configuration/optimization is determined based on the application monitoring information, the dynamic reconfigurable self-monitoring circuit and one or more optional rules or policies. In one exemplary embodiment, a set of candidate configurations are tested within a simulation based on the stored application monitoring information. A configuration tested under simulation and consistent with one or more optional policies is then selected.

For example, optional policies may limit the types of simulations performed, and/or the configurations/optimizations suggested based on an accounting metric, a class of service or various other parameters. After the new configuration/optimization is selected, control continues to step S260.

In step S260, the new configuration/optimization is sent to the dynamically reconfigurable self-monitoring circuit. Control then jumps top step S210 and the steps S210-S260 repeat for the same or another dynamically reconfigurable self-monitoring circuit.

In the above, the monitoring information can be encrypted and/or digitally signed. Further, the second configuration can also adjust the monitoring of the execution of the application. The methods can also poll the external element for new configurations and can selectively accept portions of the second configuration by the computerized device. The external element can be located on the same chip as the integrated circuit or a chip external to the integrated circuit. The transformation can be based on a policy that is determined by a manufacturer of the integrated circuit or a manufacturer of a product that embeds the integrated circuit into a device.

Figure 8:
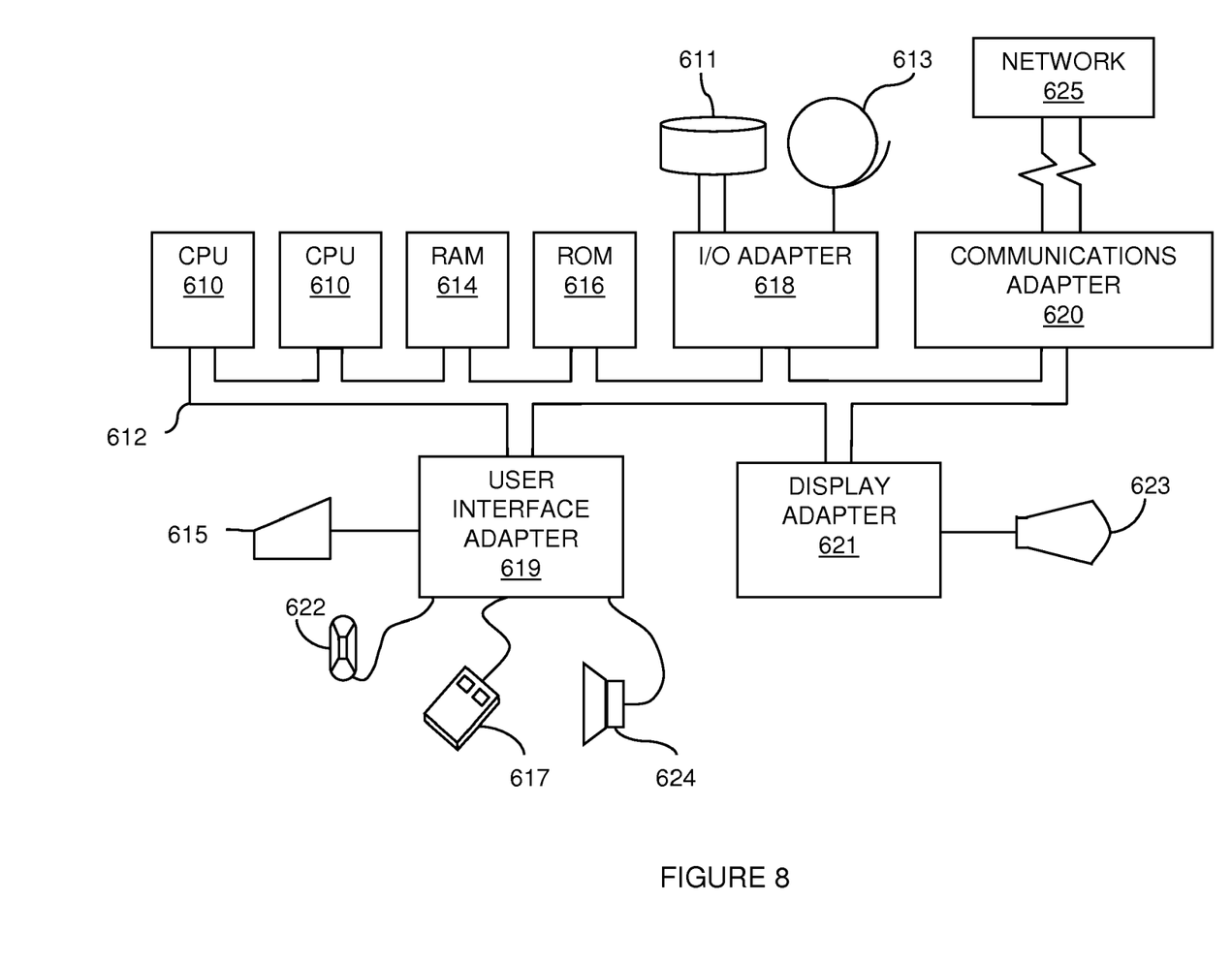
FIG. 8 is a schematic diagram illustrating an exemplary hardware environment that can be used to determine the optimization and configurations according to one aspect of the invention.

FIG. 8 is a schematic diagram illustrating an exemplary hardware environment that can be used to implement the embodiments of the invention. The dynamically reconfigurable self-monitoring circuit can be distributed by the fabricator as a chip in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing various embodiments of the invention is depicted in FIG. 8. This schematic drawing illustrates a hardware configuration of an information handling/computer system in accordance with aspects of the invention. The system comprises at least one processor, computerized device, or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for dynamically reconfiguring and optimizing an integrated circuit for an application during runtime, said integrated circuit comprising a plurality of circuit elements, said method comprising:
    configuring said plurality of circuit elements for execution of said application in a first configuration;
    determining a threshold submission criteria including one of: a period of time, a volume of monitored information, and a monitored value falling within a specified range;
    monitoring said execution and environmental data of said application during runtime on said first configuration of said plurality of circuit elements to produce monitoring information, using a computerized device, said environmental data including temperature and voltage;
    if a second configuration of said plurality of circuit elements is received from an external element separate from said computerized device based on said monitoring information, then transforming said first configuration into said second configuration of said plurality of circuit elements using said external element, otherwise storing said monitoring information in a storage structure; and
    if said threshold submission criteria is met, then sending said monitoring information to an external element and continuing said monitoring, otherwise continuing said monitoring.

2. The method of claim 1, said monitoring information being encrypted.

3. The method of claim 1, said monitoring information being digitally signed.

4. The method of claim 1, said second configuration adjusting said monitoring of said execution of said application.

5. The method of claim 1, further comprising polling, using said computerized device, said external element for new configurations.

6. The method of claim 1, further comprising selectively accepting portions of said second configuration by said computerized device.

7. The method of claim 1, said external element being located on one of: on a same chip as said integrated circuit; and a chip external to said integrated circuit.

8. The method of claim 1, said transformation being further based on a policy.

9. The method of claim 8, the policy being determined by at least one of: a manufacturer of said integrated circuit and a manufacturer of a product that embeds said integrated circuit into a device.

10. A computer-implemented method for dynamically reconfiguring and optimizing an integrated circuit for an application during runtime, said integrated circuit comprising a plurality of circuit elements, said method comprising:
    configuring said plurality of circuit elements for execution of said application in a first configuration;
    determining a threshold submission criteria including one of: a period of time, a volume of monitored information, and a monitored value falling within a specified range;
    monitoring said execution and environmental data of said application during runtime on said first configuration of said plurality of circuit elements to produce monitoring information, using a computerized device, said environmental data including temperature and voltage;
    if a second configuration of said plurality of circuit elements is received from an external element separate from said computerized device based on said monitoring information, then transforming said first configuration into said second configuration of said plurality of circuit elements using said external element and testing said second configuration using said external element, otherwise storing said monitoring information in a storage structure; and
    if said threshold submission criteria is met, then sending said monitoring information to an external element and continuing said monitoring, otherwise continuing said monitoring.

11. The method of claim 10, said monitoring information being encrypted.

12. The method of claim 10, said monitoring information is digitally signed.

13. The method of claim 10, said second configuration adjusting said monitoring of said execution of said application.

14. The method of claim 10, further comprising polling, using said computerized device, said external element for new configurations.

15. The method of claim 10, further comprising selectively accepting portions of said second configuration by said computerized device.

16. The method of claim 10, said external element being located on one of: on a same chip as said integrated circuit; and a chip external to said integrated circuit.

17. The method of claim 10, said transformation being further based on a policy.

18. The method of claim 17, said policy being determined by at least one of: a manufacturer of said integrated circuit and a manufacturer of a product that embeds said integrated circuit into a device.

19. A computer-implemented method for dynamically reconfiguring and optimizing an integrated circuit for an application during use by a consumer, said integrated circuit comprising a plurality of circuit elements, said method comprising:
configuring said plurality of circuit elements for execution of said application in a first configuration;
determining a threshold submission criteria including one of: a period of time, a volume of monitored information, and a monitored value falling within a specified range;
monitoring said execution and environmental data of said application during runtime on said first configuration of said plurality of circuit elements to produce monitoring information during use of said first configuration using a computerized device, said environmental data including temperature and voltage;
if a second configuration of said plurality of circuit elements is received from an external element separate from said computerized device based on said monitoring information, then transforming said first configuration into said second configuration of said plurality of circuit elements using said external element during use of said second configuration, otherwise storing said monitoring information in a storage structure; and
if said threshold submission criteria is met, then sending said monitoring information to an external element and continuing said monitoring, otherwise continuing said monitoring.

20. A non-transitory computer readable medium comprising instructions that when executed on a computer cause the computer to carry out the method of: dynamically reconfiguring and optimizing an integrated circuit for an application during runtime, said integrated circuit comprising a plurality of circuit elements, said computer-implemented method comprising:
configuring said plurality of circuit elements for execution of said application in a first configuration;
determining a threshold submission criteria including one of: a period of time, a volume of monitored information, and a monitored value falling within a specified range;
monitoring said execution and environmental data of said application during runtime on said first configuration of said plurality of circuit elements to produce monitoring information, using a computerized device, said environmental data including temperature and voltage;
if a second configuration of said plurality of circuit elements is received from an external element separate from said computerized device based on said monitoring information, then transforming said first configuration into said second configuration of said plurality of circuit elements using said external element, otherwise storing said monitoring information in a storage structure; and
if said threshold submission criteria is met, then sending said monitoring information to an external element and continuing said monitoring, otherwise continuing said monitoring.

21. A computerized system for dynamically reconfiguring and optimizing integrated circuit for an application during runtime, said integrated circuit comprising a plurality of circuit elements, said system comprising:
a plurality of circuit elements configured into a first configuration;
a memory that stores threshold submission criteria including one of: a period of time, a volume of monitored information, and a monitored value falling within a specified range; and
a processor that:
configures said plurality of circuit elements for execution of said application in a first configuration;
determines a threshold submission criteria including one of: a period of time, a volume of monitored information, and a monitored value falling within a specified range;
monitors said execution and environmental data of said application during runtime on said first configuration of said plurality of circuit elements to produce monitoring information, using a computerized device, said environmental data including temperature and voltage;
if a second configuration of said plurality of circuit elements is received from an external element separate from said computerized device based on said monitoring information, then transforms said first configuration into said second configuration of said plurality of circuit elements using said external element, otherwise stores said monitoring information in a storage structure; and
if said threshold submission criteria is met, then sends said monitoring information to an external element and continues said monitoring, otherwise continues said monitoring.

22. The system of claim 21, said monitoring information being encrypted.

23. The system of claim 21, said second configuration adjusting said monitoring of said execution of said application.

24. The system of claim 21, further comprising said processor that selectively accepts portions of said second configuration by said computerized device.

25. The system of claim 21, in which said external element being located on one of: on a same chip as said integrated circuit; and a chip external to said integrated circuit.

* * * * *